United States Patent
Wickett

(10) Patent No.: US 10,754,375 B2
(45) Date of Patent: Aug. 25, 2020

(54) DISPLAY COVER WITH WEBCAM COVER

(71) Applicant: TARGUS INTERNATIONAL LLC, Anaheim, CA (US)

(72) Inventor: Geoffrey Howard Wickett, Buckinghamshire (GB)

(73) Assignee: TARGUS INTERNATIONAL LLC, Anaheim, CA (US)

( * ) Notice: Subject to any disclaimer, the term of this patent is extended or adjusted under 35 U.S.C. 154(b) by 0 days.

(21) Appl. No.: 16/656,379

(22) Filed: Oct. 17, 2019

(65) Prior Publication Data

US 2020/0050238 A1 Feb. 13, 2020

Related U.S. Application Data

(62) Division of application No. 16/293,442, filed on Mar. 5, 2019, now abandoned.

(60) Provisional application No. 62/638,791, filed on Mar. 5, 2018.

(51) Int. Cl.
G06F 1/16 (2006.01)

(52) U.S. Cl.
CPC .......... *G06F 1/1607* (2013.01); *G06F 1/1686* (2013.01); *G06F 1/1616* (2013.01); *G06F 2200/1612* (2013.01)

(58) Field of Classification Search
CPC ................ G06F 1/1686; G06F 1/1607; G06F 2200/1612; G06F 1/1616; G03B 11/04; G03B 11/041; G03B 11/043
See application file for complete search history.

(56) References Cited

U.S. PATENT DOCUMENTS

| | | | |
|---|---|---|---|
| 9,345,357 B1 | 5/2016 | Davila, Jr. | |
| 9,444,508 B2 | 9/2016 | Lee | |
| D782,562 S | 3/2017 | Gustaveson, II | |
| 9,829,669 B1 | 11/2017 | Leipold | |
| 9,854,142 B2 | 12/2017 | Freeze | |
| 10,070,021 B1 | 9/2018 | Rolle | |
| 2008/0100713 A1 | 5/2008 | Liu | |
| 2010/0102979 A1 | 4/2010 | Huang et al. | |
| 2011/0058255 A1 | 3/2011 | Weiss | |
| 2011/0182029 A1 | 7/2011 | Wu et al. | |
| 2014/0063049 A1 | 3/2014 | Armstrong-Muntner | |
| 2014/0333831 A1* | 11/2014 | Oh ........................ | H04M 1/67 348/376 |

(Continued)

FOREIGN PATENT DOCUMENTS

CN 205651721 U 10/2016
DE 202017102528 U1 5/2017

(Continued)

OTHER PUBLICATIONS

U.S. Appl. No. 16/293,442, Non-Final Office Action, dated Aug. 6, 2019, 14 pages.

(Continued)

*Primary Examiner* — Abhishek M Rathod
(74) *Attorney, Agent, or Firm* — Stoel Rives LLP

(57) ABSTRACT

According to various embodiments, a display cover of an electronic display includes a cover configured to extend over the electronic display, a webcam aperture extending through the cover and configured to enable a webcam to view through the cover, and a webcam cover to be manipulated between a closed position wherein the webcam cover substantially obstructs the webcam aperture and an open position wherein the webcam cover does not substantially obstruct the webcam aperture.

9 Claims, 10 Drawing Sheets

(56) References Cited

U.S. PATENT DOCUMENTS

| | | | |
|---|---|---|---|
| 2015/0009399 | A1 | 1/2015 | Jonsson et al. |
| 2015/0059251 | A1 | 3/2015 | Rinner et al. |
| 2015/0236743 | A1 | 8/2015 | Kennedy |
| 2016/0087670 | A1 | 3/2016 | Lee |
| 2017/0092229 | A1 | 3/2017 | Greenebaum et al. |
| 2018/0059510 | A1* | 3/2018 | Gustaveson, II ..... G06F 1/1686 |
| 2018/0276418 | A1* | 9/2018 | Li ..................... G02B 5/203 |
| 2018/0314292 | A1* | 11/2018 | Son .................. G06F 1/1609 |
| 2019/0138737 | A1 | 5/2019 | Leipold |
| 2019/0179212 | A1* | 6/2019 | Leimer .................. H04N 5/232 |
| 2019/0272005 | A1 | 9/2019 | Wickett |

FOREIGN PATENT DOCUMENTS

| | | |
|---|---|---|
| WO | 2017069490 A1 | 4/2017 |
| WO | 2019173346 A1 | 9/2019 |

OTHER PUBLICATIONS

Goodbros., "Minimal Size Privacy Protecting WebCam cover "Spyslide" (with English translation)", NAVER blog, https://m.post.naver.com/viewer/postView.nhn?volumeNo=7636827&memberNo=36238167&vType=Vertical, May 15, 2017, 32 pages.

PCT/US2019/020762, International Search Report and Written Opinion, dated Jun. 13, 2019, 11 pages.

Tech Armor, "Tech Armor Macbook Pro Privacy Screen Protector, Privacy Apple MacBook Pro Retina", https://www.amazon.com/Macbook-Privacy-Protector-Tech-Armor/dp/B01MZ1W2Y2, Dec. 20, 2016, 9 pages.

Vmei, "Echo Show Screen Protecto", https://www.amazon.com/Protector-Important-Everyones-Safe-Designed-VMEI/dp/B075W6Y—Retrieved Jul. 30, 2019, 2017.

* cited by examiner

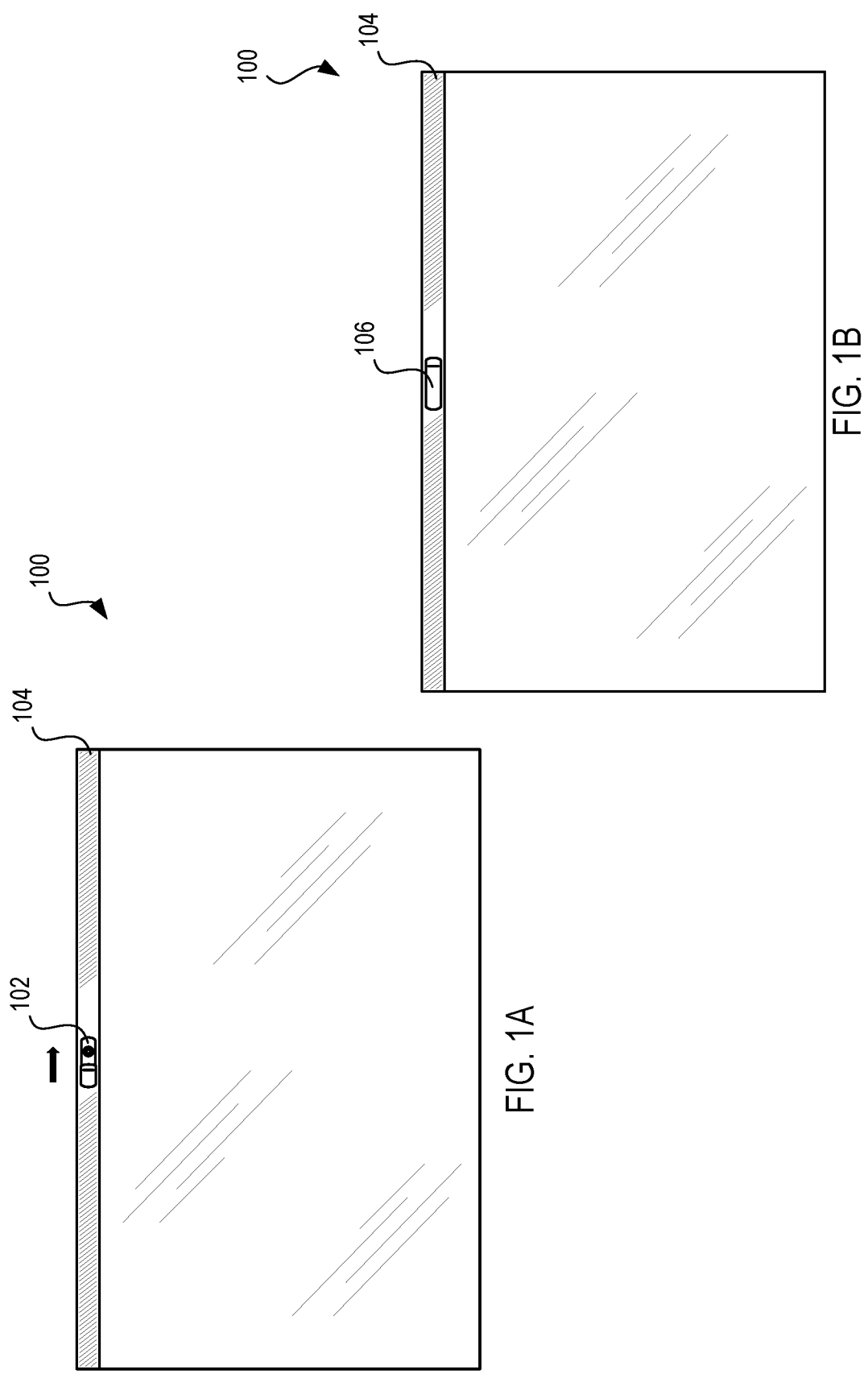

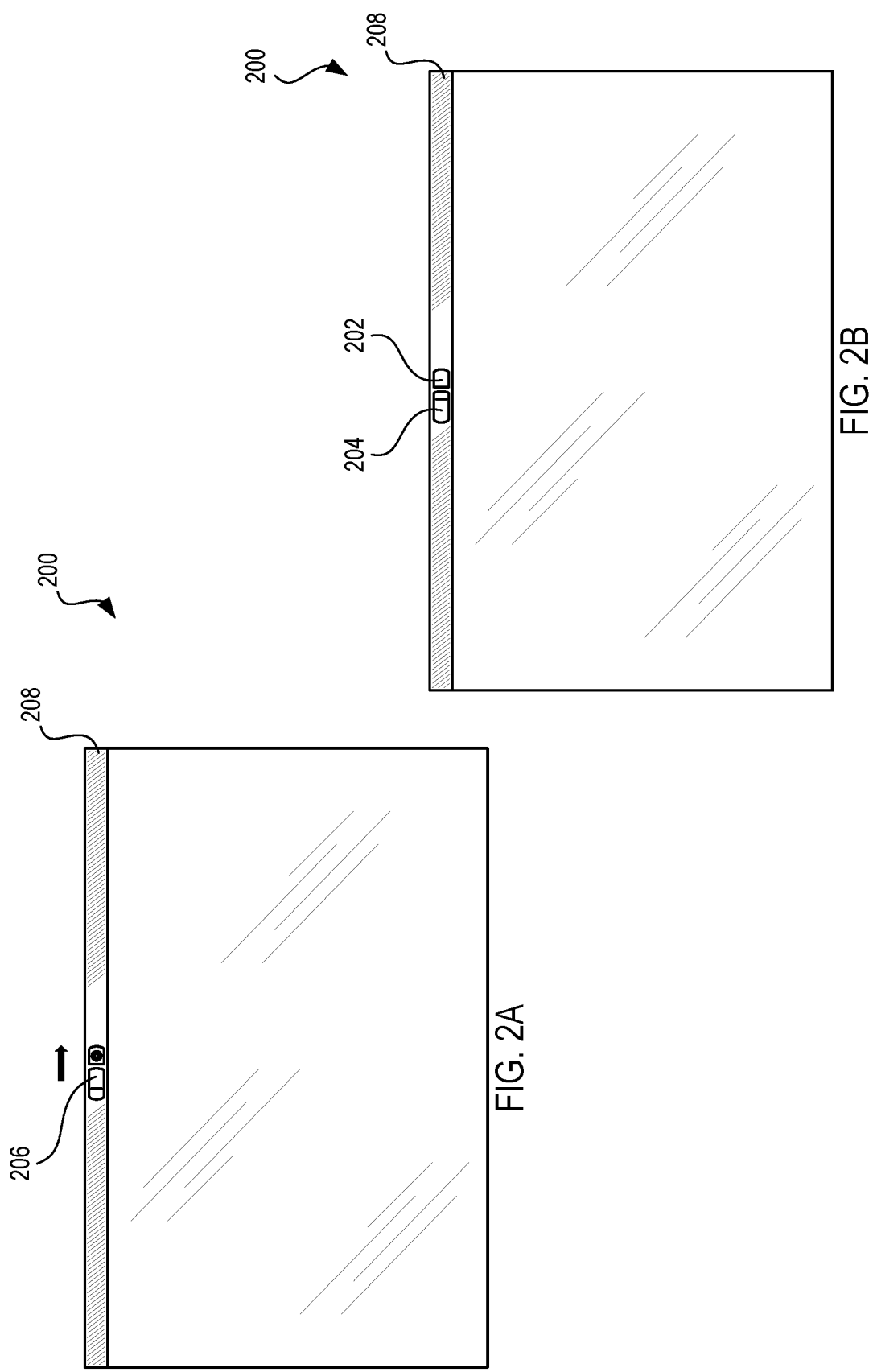

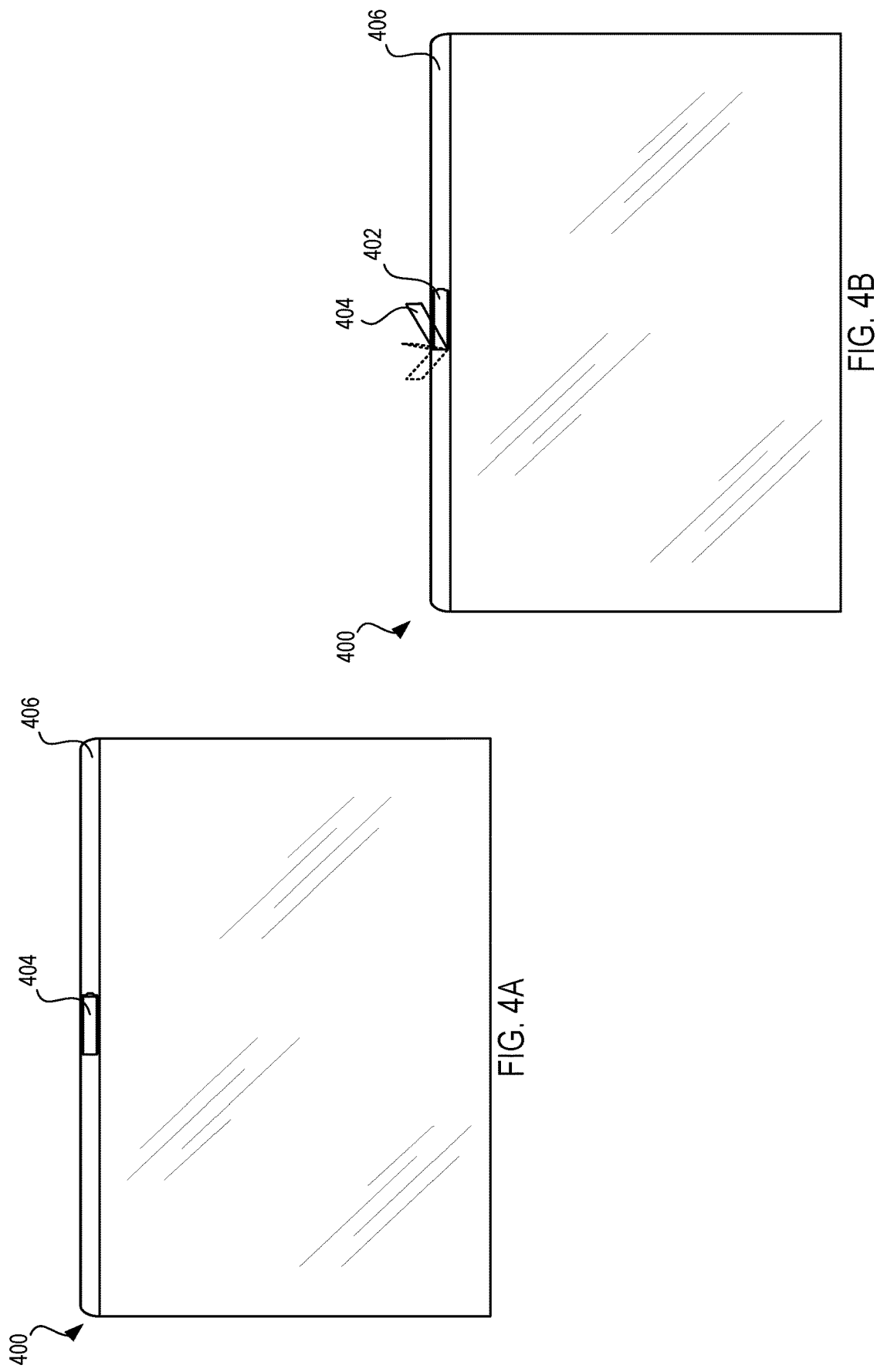

DISPLAY COVER WITH WEBCAM COVER

RELATED APPLICATIONS

This application claims the benefit of U.S. patent application Ser. No. 16/293,442, filed Mar. 5, 2019, which in turn claims priority to U.S. Provisional Application No. 62/638,791, filed Mar. 5, 2018 both of which are incorporated by reference herein in their entirety.

TECHNICAL FIELD

This disclosure generally relates to display covers that include integrated webcam covers for use with displays that include a webcam.

BRIEF DESCRIPTION OF THE DRAWINGS

Non-limiting and non-exhaustive embodiments of the disclosure are described, including various embodiments of the disclosure with reference to the figures, in which:

FIGS. 1A-1D illustrate one embodiment of a display cover with a webcam cover.

FIGS. 2A-2C illustrate an alternative embodiment of a display cover with a webcam cover.

FIGS. 4A-4B illustrate an alternative embodiment of a display cover with a webcam cover.

DETAILED DESCRIPTION

According to various embodiments, display covers may be secured to a display of a laptop computer, television, computer monitor, and/or other electronic display device. A display cover may be configured to protect the display, shift a color of the display, dim the display, polarize the display, provide an anti-glare surface for the display, provide a privacy screen for the display, and/or otherwise modify or protect the display. Such display covers may be secured to a display using magnets, adhesives, tabs, suction, fastener, clamp, or the like to permanently or temporarily secure a display cover to a display.

In various embodiments, a display cover may include dimensions specifically adapted for a particular display. Additionally, one or more notches or cutouts may be formed in the display cover to facilitate positioning and handling. In various embodiments, multiple display covers may be utilized in conjunction with a single display.

A "display" as used throughout the specification may include any of a wide variety of active or passive electronic visual displays, or portions thereof. Specifically contemplated and illustrated are the displays of laptop computers and desktop monitors, including those utilizing plasma, LCD, LED, OLED, E-Ink, and related technologies. However, the term "display" also includes, but is not limited to, the visual displays of electronic readers, tablet computers, tablet PCs, cellular phones, interactive displays, video displays, touch screens, touch computers, and the like. In various embodiments, a display may include a webcam.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. As may be appreciated by one of skill in the art, characteristics and alternatives described in conjunction with one embodiment may be equally applicable to other embodiments, even if not explicitly stated.

In the following description, numerous details are provided to give a thorough understanding of various embodiments; however, the embodiments disclosed herein can be practiced without one or more of the specific details, or with other methods, components, materials, etc. In some instances, well-known structures, materials, or operations are not shown or described in detail to avoid obscuring aspects of this disclosure. It is understood that any of a wide variety of materials and manufacturing methods may be used to produce the various components of the presently described display covers and webcam covers. A wide variety of magnets, adhesives, clamps, tabs, suction, fastener, clamps and other securing mechanisms may be employed to adhere the display cover to a display.

Figure 1D:
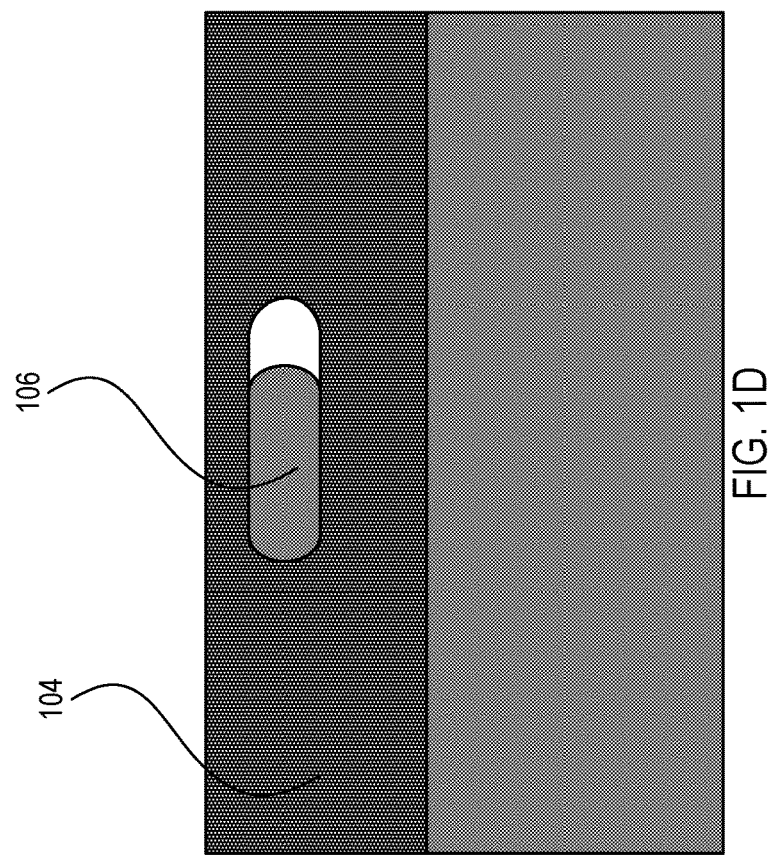
Figure 1C:
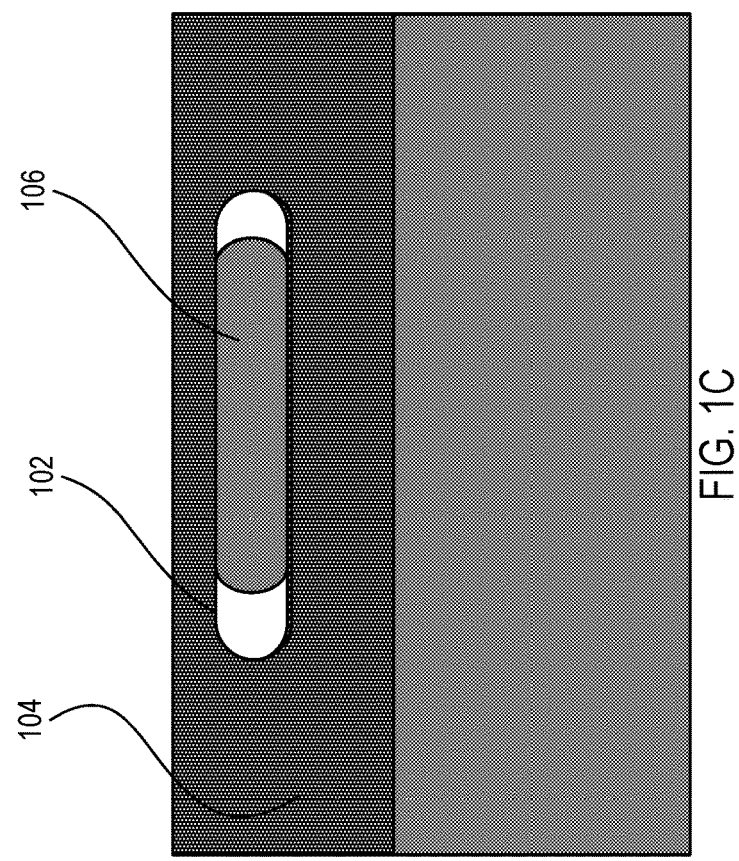

FIG. 1 illustrates a display cover 100 according to various embodiments. The display cover 100 may be configured with any shape, size, or thickness to accommodate any of a wide variety of displays. In the illustrated embodiments, display cover 100 is configured with dimensions suitable for a computer display, such as the display of a laptop computer. In other embodiments, display cover 100 may be configured to accommodate a tablet computer display, a telephone display, a desktop computer display, or other electronic display.

The display cover 100 may be adapted to provide various protective and/or enhancement features to the display on which it is placed. For example, the display cover 100 may be adapted to protect the display, shift a color of the display, dim the display, polarize the display, provide an anti-glare surface for the display, provide a privacy screen for the display, and/or otherwise modify or protect the display. In various embodiments, display cover 100 may be secured to a display using static, adhesives, and/or a fastener. For example, a clamp, suction cup, Velcro, a mechanical fastener, and/or an adhesive may be used to permanently or temporarily secure a display cover to a display.

Referring to FIGS. 1A-1D, an embodiment of a display cover 100 is shown with an aperture 102 which is positioned within the display cover 100 to enable webcam viewing. The aperture 102 may extend through the display cover 100 as well as a magnetic material 104. The magnetic material 104 may be embodied as a film which adheres to the display cover 100 to allow magnetic coupling with a display. The display cover 100 also includes a slide cover 106 which is opaque and slides within the aperture 102 to enable or prevent webcam viewing.

Figure 2C:
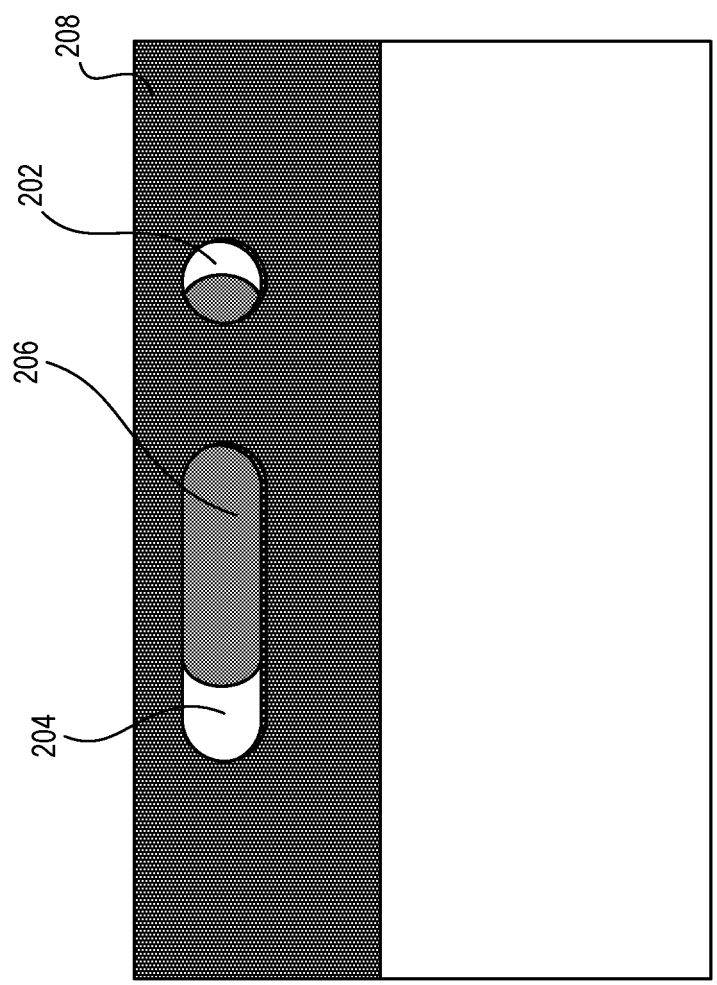

Referring to FIGS. 2A-2C, an alternative embodiment of a display cover 200 is shown with a webcam aperture 202 which is positioned within the display cover 200 to enable webcam viewing. The display cover 200 also includes a finger aperture 204 to enable finger access to a slide cover 206. The slide cover 206 is opaque and moves between open and closed positions to enable or prevent webcam viewing. The apertures 202, 204 may extend through the display cover 200 as well as a magnetic material 208.

Figure 3A:
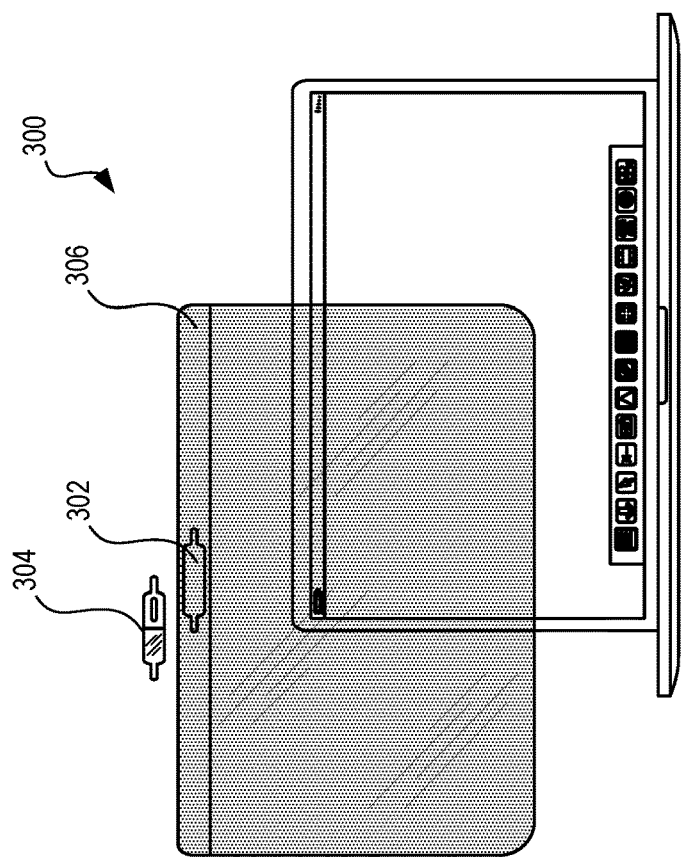
FIGS. 3A-3B illustrate an alternative embodiment of a display cover with a webcam cover.
Figure 3B:
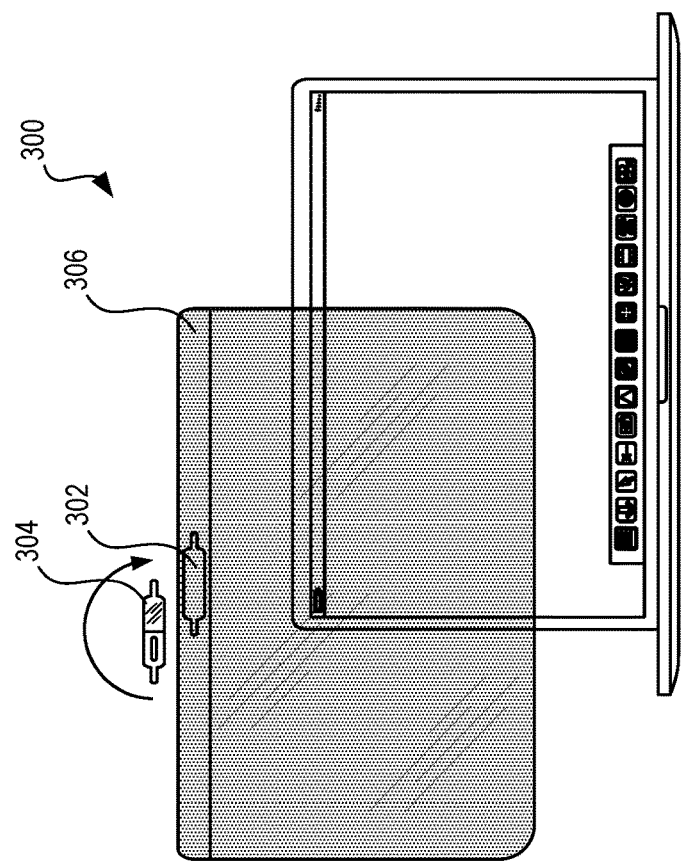

Referring to FIGS. 3A-3B, an alternative embodiment of a display cover 300 is shown with a webcam aperture 302 which is positioned within the display cover 300 to enable webcam viewing. A webcam cover 304 is insertable within the webcam aperture 302. The webcam cover 304 may also be referred to as a puzzle piece and includes an opaque portion and a transparent portion. The transparent portion is placed over the webcam to enable viewing and the opaque portion is placed over the webcam to prevent viewing. Accordingly, the webcam cover 304 may be rotated 180 degrees to enable or prevent viewing. As in previous embodiments, the webcam aperture 302 may extend through the display cover 300 as well as a magnetic material 306.

Referring to FIGS. 4A-4B, an alternative embodiment of a display cover 400 is shown with a webcam aperture 402 which is positioned within the display cover 400 to enable webcam viewing. The display cover 400 also includes an opaque door 404 with a living hinge to cover the webcam aperture 402. A user can flip open the opaque door 404 to access the webcam aperture 402 and close the opaque door 404 when done. The webcam aperture 402 extends through the display cover 400 as well as a magnetic material 406.

Figure 5B:
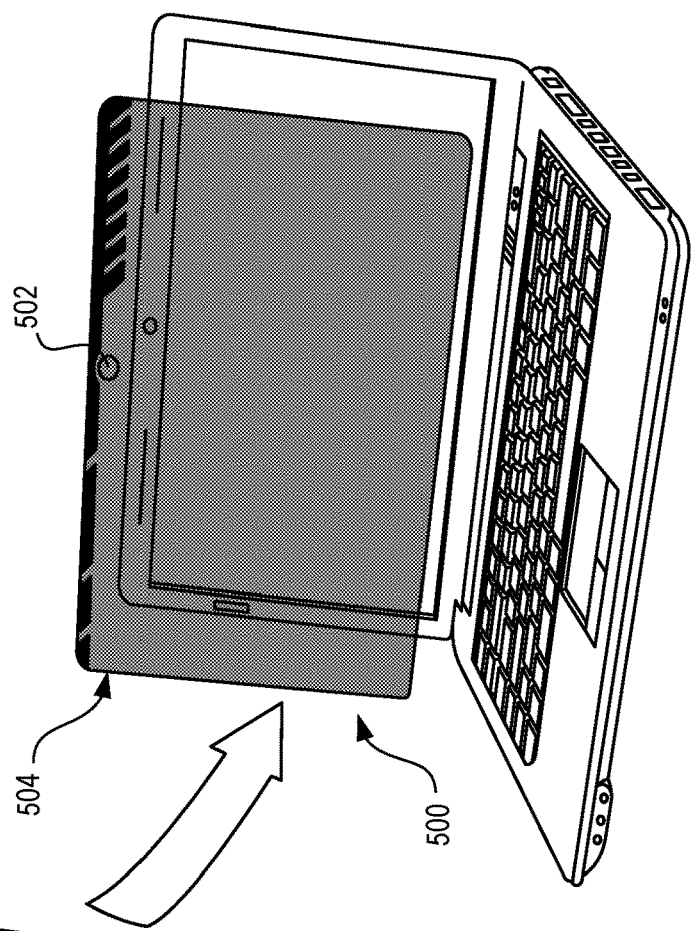
FIGS. 5A-5B Illustrate an alternative embodiment of a display cover with a webcam cover.
Figure 5A:
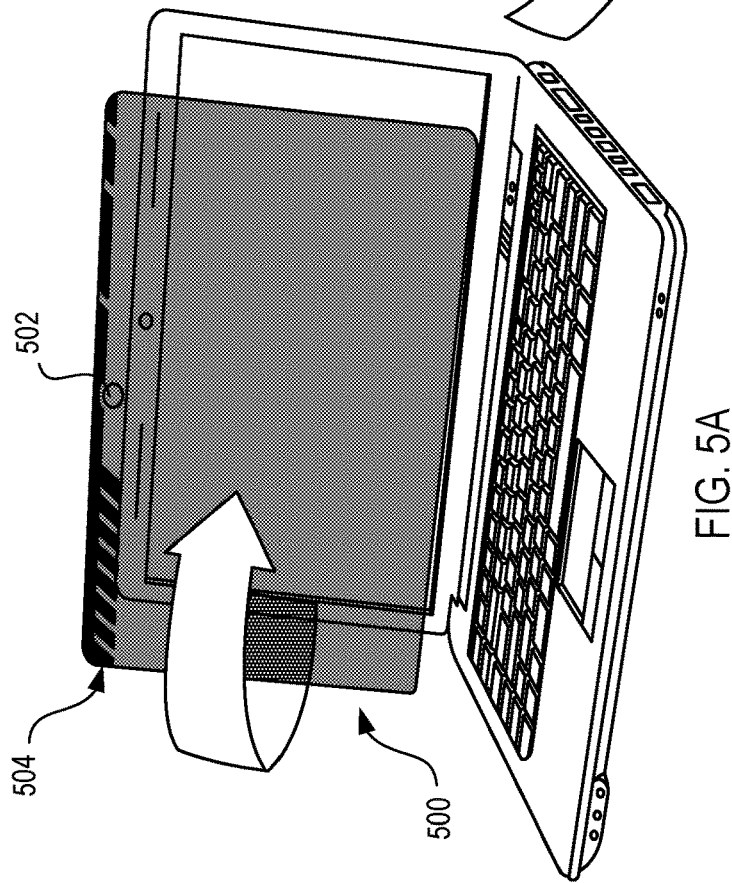

Referring to FIGS. 5A-5B, an alternative embodiment of a display cover 500 is shown with a one-way lens piece 502 that is positioned within the display cover 500 to enable webcam viewing. As the name indicates, the one-way lens piece 502 allows viewing through one side (e.g., allows viewing through the back of the one-way lens piece 502) and prevents viewing through the other side (e.g., prevents viewing through the face of the one-way lens piece 502). The display cover 500 may not have any moving parts. A user may remove the display cover and flip it to face the one-way lens away from the webcam to enable webcam viewing, or the user may remove the display cover and flip it to face the one-way lens toward the webcam to prevent webcam viewing. The one-way lens piece 502 may be placed within and/or integrated into a webcam aperture in the display cover 500 that extends through the display cover 500 and may also extend through a magnetic material 504.

Figure 6B:
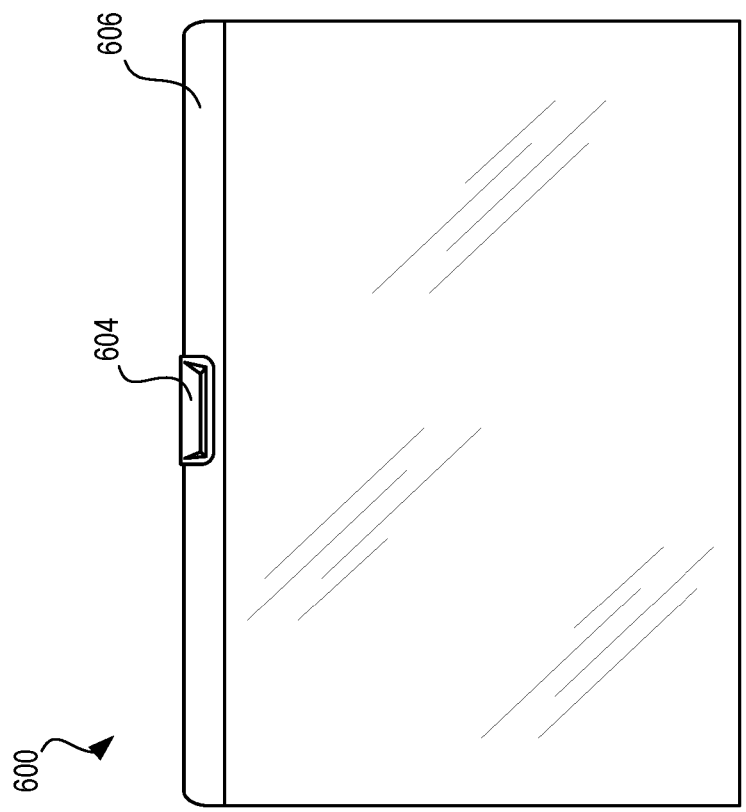
FIGS. 6A-6B illustrate an alternative embodiment of a display cover with a webcam cover.
Figure 6A:
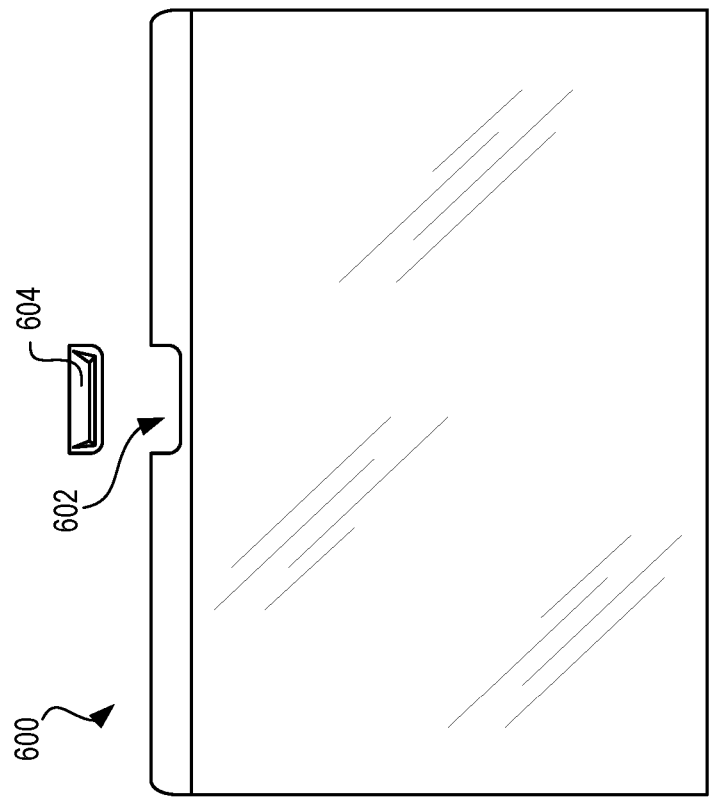

Referring to FIGS. 6A-6B, an alternative embodiment of a display cover 600 is shown with a webcam gap 602 which is positioned within the display cover 600 to enable webcam viewing. The display cover 600 includes a gap cover 604 to cover the webcam gap 602. A user can insert or remove the gap cover 604 to enable or prevent webcam viewing. The webcam gap 602 may extend into a magnetic material 606 which magnetically couples to a display.

Figure 7A:
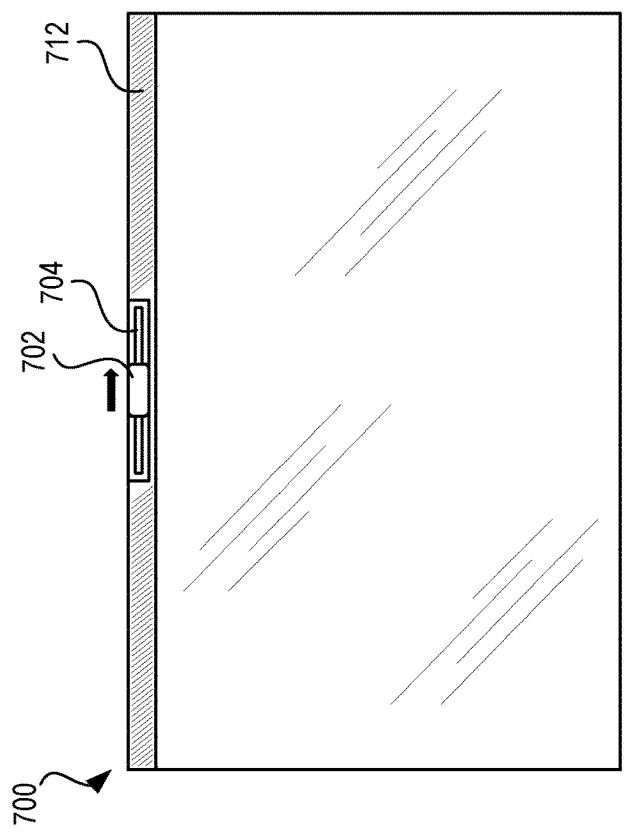
FIGS. 7A-7C illustrate an alternative embodiment of a display cover with a webcam cover.
Figure 7B:
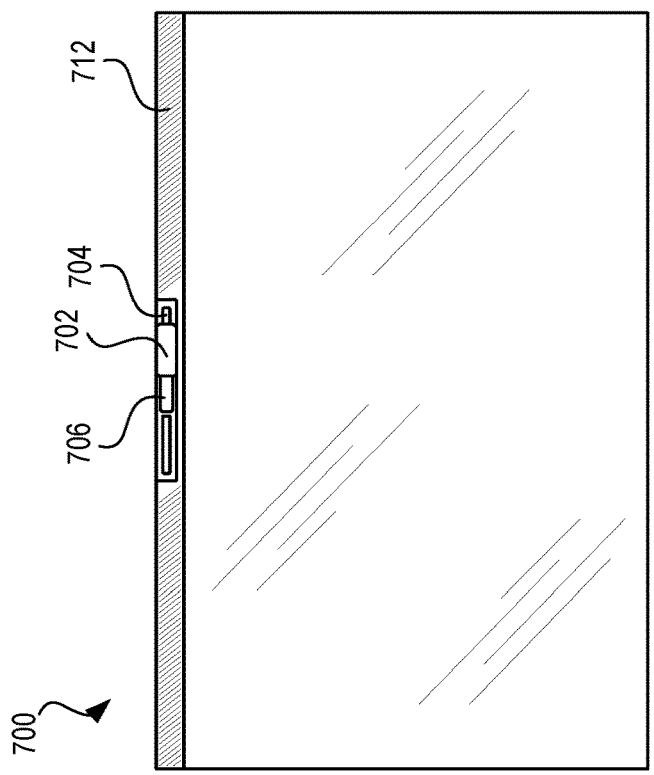
Figure 7C:
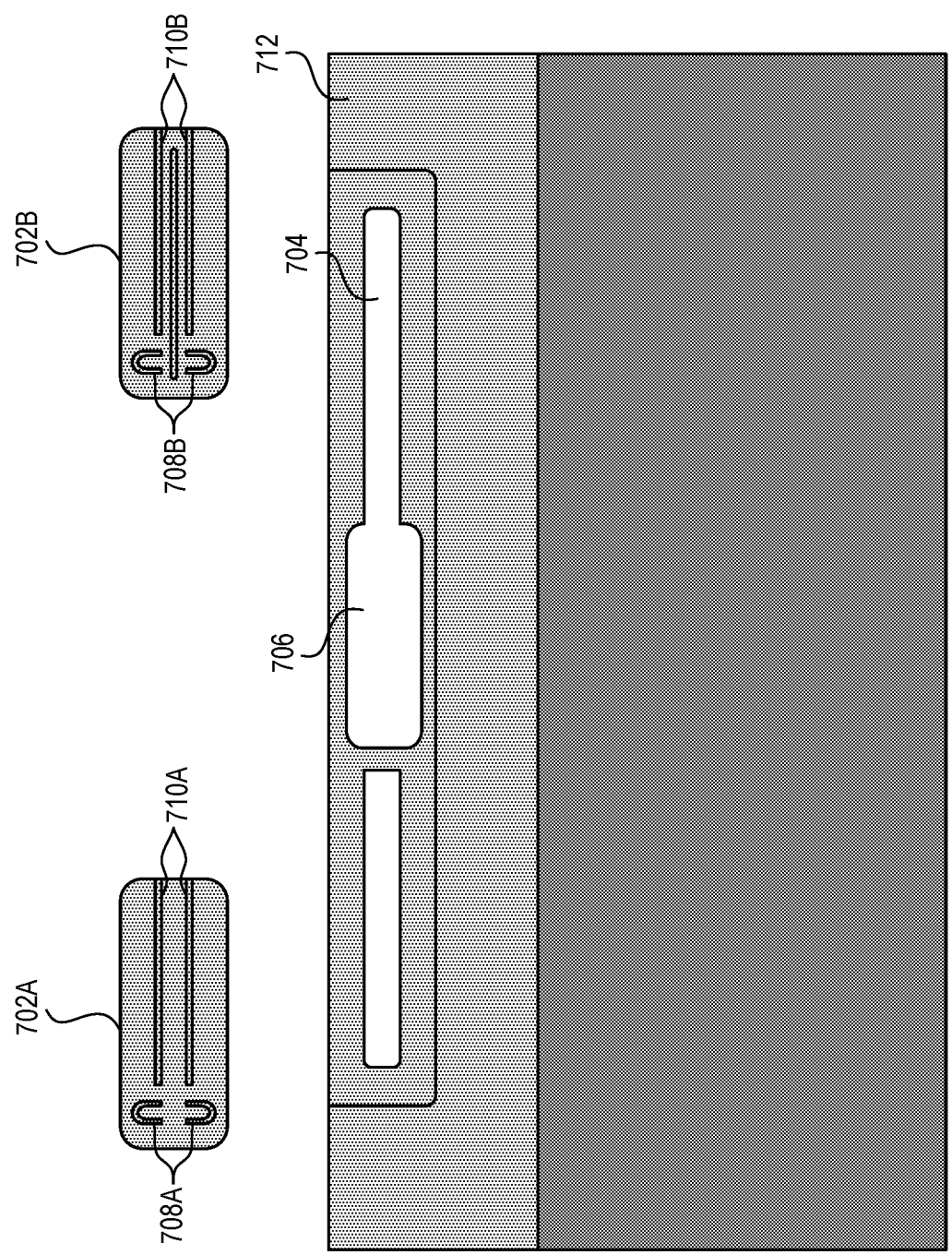

Referring to FIGS. 7A-7C, an alternative embodiment of a display cover 700 is shown with a sliding tab 702 that slides within a railway 704 adjacent to an aperture 706 to optionally cover and optionally uncover the aperture 706 to enable or prevent webcam viewing through the aperture 706. As in previous embodiments, the aperture 706 may extend through the display cover 700 as well as a magnetic material 712.

Referring specifically to FIG. 7C, the sliding tab 702 has been broken into tab pieces 702A and 702B. The tab pieces 702A and 702B each have tab stops 708A, 708B, and rails 710A, 710B. In some embodiments, to form the assembled sliding tab 702, the tab piece 702A and the tab piece 702B may each be arranged on opposite sides of the aperture 706 and/or the railway 704, with tab stops 708A, 708B each reaching towards each other through the aperture 706 and with rails 710A, 710B each reaching towards each other through the aperture 706 and/or the railway 704. As can be seen in FIG. 7C, in some embodiments, the railway 704 and the aperture 706 may be connected in order to allow the features of an assembled sliding tab 702 to slide as shown in FIGS. 7A and 7B.

In some embodiments, one or both of the tab stops 708A, 708B of the assembled sliding tab 702 may be shaped and positioned such that they remain within the confines of the aperture 706 when the sliding tab 702 slides to the left or to the right, thus limiting the horizontal movement of the sliding tab 702). Further, one or both of the tab stops 708A, 708B of the assembled sliding tab 702 may be shaped and positioned such that they limit the vertical movement of the sliding tab 702 (on at least the end of the sliding tab 702 with the tab stops 708A, 708B). One or both of the rails 710A, 710B of the sliding tab 702 may be shaped and positioned such that at least part of one or more of the rails 710A, 710B fit within the confines of the railway 704, limiting the vertical movement of the sliding tab 702 (on at least the end of the sliding tab 702 opposite the tab stops 708A, 708B). In some embodiments, the placement of the tab stops 708A, 708B within the assembled sliding tab 702 may prevent the sliding tab 702 from sliding far enough to the left such that the rails 710A, 710B disengage completely from the railway 704.

Skilled persons will recognize that the railway 704 may take forms other than that of an aperture located in the display cover 700 (as illustrated in FIGS. 7A-7C). For example, the railway 704 may instead be an additional feature that is built into the display cover 700 that accepts one or more of rails 710A, 710B. In this case, rails 710A, 710B may be configured to slide along the additional built in feature.

The above description provides numerous specific details for a thorough understanding of the embodiments described herein. However, those of skill in the art will recognize that one or more of the specific details may be omitted or combined with those of another embodiment. Additionally, various methods, components, or materials may be used. In some cases, operations are not shown or described in detail.

What is claimed:

1. A display cover for an electronic display, comprising:
a cover configured to extend over the electronic display;
a webcam aperture extending through the cover and configured to enable a webcam to view through the cover;
a railway communicating with and extending horizontally from the webcam aperture; and
a webcam cover configured to be manipulated horizontally between a closed position wherein the webcam cover substantially obstructs the webcam aperture and an open position wherein the webcam cover rests at least partially along the railway and does not substantially obstruct the webcam aperture, the webcam cover comprising,
a sliding tab including,
first and second tab pieces disposed on opposing sides of the cover and coupled to each other through the webcam aperture and the railway wherein the first and second tab piece each includes a rail configured to slide horizontally along the railway.

2. The display cover of claim 1, wherein the webcam aperture extends vertically more than the railway.

3. The display cover of claim 1, wherein the webcam aperture extends horizontally less than the railway.

4. The display cover of claim 1, wherein the first and second tab pieces each include a plurality of rails.

5. The display cover of claim 1, wherein the first and second tab pieces each include a tab stop configured to limit horizontal movement.

6. The display cover of claim 5, wherein the tab stop of each tab piece is perpendicular to a corresponding rail.

7. The display cover of claim 1, wherein sliding tab includes an opaque material.

8. The display cover of claim 1, wherein the display cover attaches to the electronic display with a magnet.

9. The display cover of claim 1, wherein the cover is adapted to perform one or more of: protect the display, shift a color of the display, dim the display, polarize the display, provide an anti-glare surface for the display, and provide a privacy screen for the display.

* * * * *